US005589905A

United States Patent [19]
McIntyre

[11] Patent Number: 5,589,905
[45] Date of Patent: Dec. 31, 1996

[54] CAMERA WITH ILLUMINATION SOURCE

[75] Inventor: Dale F. McIntyre, Honeoye Falls, N.Y.

[73] Assignee: Eastman Kodak Company, Rochester, N.Y.

[21] Appl. No.: 378,129

[22] Filed: Jan. 24, 1995

[51] Int. Cl.$^6$ .............. G03B 13/16; G03B 13/18
[52] U.S. Cl. ........................... 396/431; 396/106
[58] Field of Search ................... 354/222, 403, 354/64

[56] References Cited

U.S. PATENT DOCUMENTS

| | | | |
|---|---|---|---|
| 2,282,045 | 5/1942 | Fleischer | 95/44 |
| 3,008,398 | 11/1961 | Sanborn | 95/44 |
| 4,714,321 | 12/1987 | Sillitto | 350/174 |
| 4,777,501 | 10/1988 | Caimi et al. | 354/64 |
| 4,918,476 | 4/1990 | Tejima | 354/221 |
| 4,963,017 | 10/1990 | Schneiter et al. | 354/403 |
| 5,005,213 | 4/1991 | Hanson et al. | 358/93 |
| 5,059,019 | 10/1991 | McCullough | 352/171 |
| 5,082,362 | 1/1992 | Schneiter | 354/403 |
| 5,150,146 | 9/1992 | Ueda et al. | 354/403 |
| 5,189,463 | 2/1993 | Capper et al. | 354/403 |
| 5,286,973 | 2/1994 | Westrom et al. | 250/253 |
| 5,302,997 | 4/1994 | Cocca | 354/432 |

FOREIGN PATENT DOCUMENTS

| | | | |
|---|---|---|---|
| 2252836 | 8/1992 | United Kingdom | G03B 15/035 |
| WO93/13452 | 7/1993 | WIPO | G03B 13/02 |

*Primary Examiner*—Michael L. Gellner
*Assistant Examiner*—Michael Dalakis
*Attorney, Agent, or Firm*—David A. Howley

[57] ABSTRACT

A camera device for a photographer viewing a scene to be photographed includes an illumination source for illuminating the scene and means for linearly scanning the scene with said illumination source to provide a visible linear indication of a scanned region of the scene. Control means vary the brightness of the illumination in accordance with changes in one or more scene parameters, to ensure constant visibility of the linear indication.

9 Claims, 3 Drawing Sheets

CAMERA WITH ILLUMINATION SOURCE

CROSS-REFERENCE TO RELATED APPLICATION

Reference is made to commonly assigned copending application Ser. No. 08/201,827, entitled Camera with Pointing Aid and filed Feb. 25, 1994 in the name of McIntyre, which is assigned to the assignee of this application.

FIELD OF THE INVENTION

The invention relates generally to the field of photography, and in particular to cameras. More specifically, the invention relates to a camera which provides a visible linear indication of a scanned region of a scene.

BACKGROUND OF THE INVENTION

Cameras serve as image capture devices, taking pictures of an ambient scene through an objective lens. For example, a photographic still camera stores an image, either photoelectronically into memory or photochemically onto a filmstrip, when an image capture button, such as a shutter button, is fully depressed. In a still camera, pressing the shutter button causes a shutter to be tripped, which permits light from the scene to pass through the objective lens and fall onto a photodiode array or film strip located at a focal plane of the lens. A video camera or movie camera captures a sequence of images that, when played back, presents the illusion of motion.

A camera user typically looks through a camera viewfinder to determine which portion of the scene is within the camera's field of view. At times, such as under low light conditions or in a crowded scene, it can be difficult to judge the portion of the scene which is in the camera's field of view. At other times, such as when tracking fast moving objects in the scene or when picture taking discretion is desired, it might be desirable to compose a scene without looking through the viewfinder at all. However, not using the viewfinder to compose a scene risks cutting off a part of the scene whose image the camera user would like to capture.

U.S. Pat. No. 5,059,019 (the '019 patent) provides a solution to the problems mentioned in the previous paragraph. The '019 patent discloses a movie camera having a laser framefinder. The laser framefinder generates a laser beam which is scanned about the periphery of a portion of a scene that is in the camera's field of view. The result is four solid appearing lines which frame a portion of the scene. As such, the camera operator can discern the portion of the scene being captured by the camera by simply observing where the laser light frame falls on the scene.

Although the disclosure of the '019 patent permits easier scene composition, there is no provision for varying the brightness of the laser light frame to account for the widely varying conditions under which the camera is used. For example, under bright ambient light conditions or when the camera-to scene distance is great, it can be difficult to see the laser frame and discern the portion of the scene about which the laser frame is located. Conversely, under dim ambient light conditions or when the camera-to scene distance is small, the laser frame can be too bright, distracting the camera operator and those people whose image is to be recorded.

Thus, it would be desirable to control the brightness of the emitted beam so that the laser frame is readily discernible to the camera user under a variety of conditions. Further, while it is important that the emitted beam should be sufficiently bright to be readily seen by the camera user, it also is important that the beam not be so extraordinarily bright that it distracts persons or animals in the scene.

From the discussion above, it should be apparent that there is a need for a camera with a framing aid that is visible under a variety of conditions. The present invention fulfills this need.

SUMMARY OF THE INVENTION

The present invention is directed to overcoming one or more of the problems set forth above. Briefly summarized, according to one aspect of the present invention, a camera device for a photographer viewing a scene to be photographed includes an illumination source for illuminating the scene and means for linearly scanning the scene with said illumination source to provide a visible linear indication of a scanned region of the scene. Control means vary the brightness of the illumination in accordance with changes in one or more scene parameters, to ensure constant visibility of the linear indication.

In a preferred embodiment of the invention, the control means varies the perceived brightness of the illumination by varying a scan rate of the scanning means in accordance with changes in one or more scene parameters. As the ambient scene light and camera-to-scene distance increase, the scan rate is decreased to increase the brightness of the illumination. As the ambient scene light and camera-to-scene distance decrease, the scan rate is increased to decrease the brightness of the visible light beam. Consequently, the outline of the portion of the scene will be visible under a variety of scene parameters.

These and other aspects, objects, features and advantages of the present invention will be more clearly understood and appreciated from a review of the following detailed description of the preferred embodiments and appended claims, and by reference to the accompanying drawings.

DESCRIPTION OF THE PREFERRED EMBODIMENTS

Figure 1:
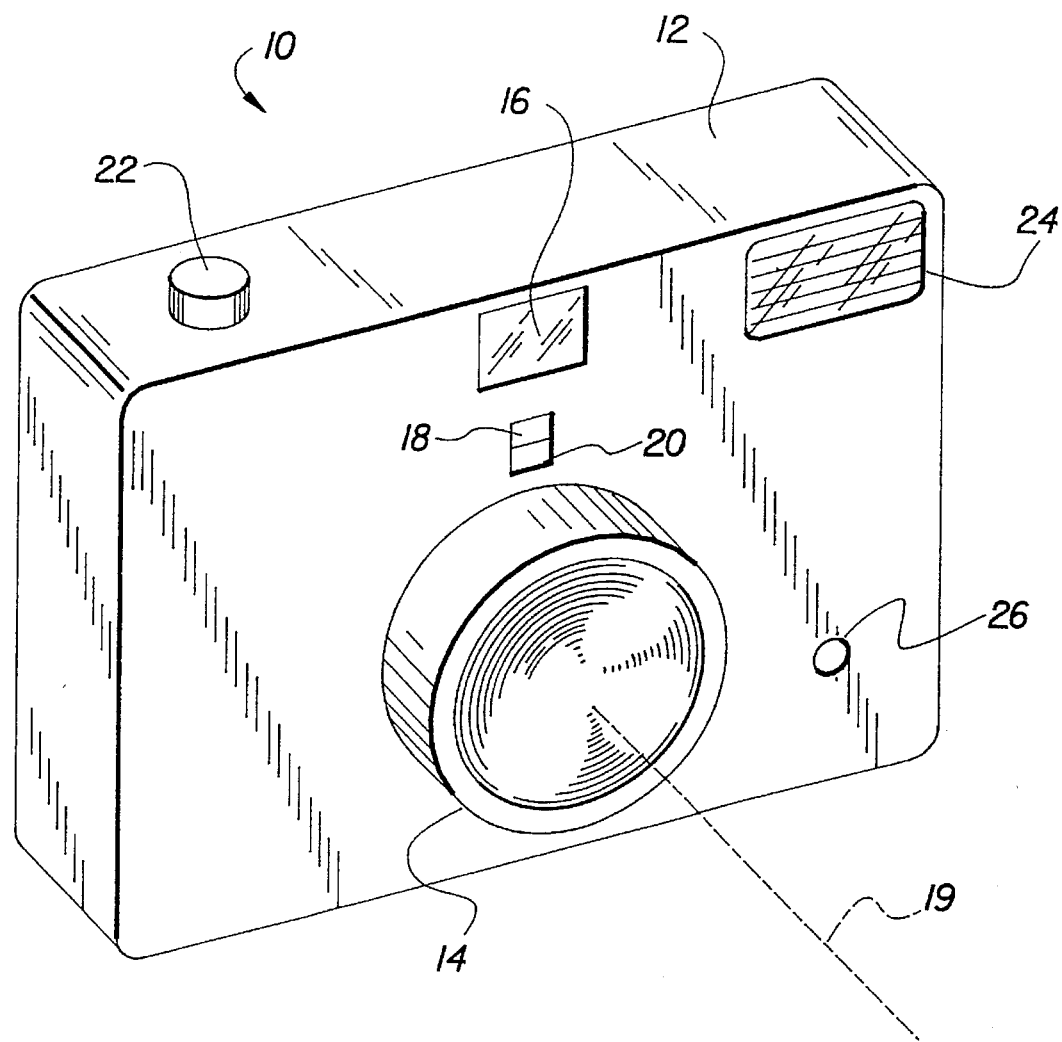
FIG. 1 is a perspective view of a camera constructed in accordance with the present invention.

FIG. 1 illustrates a camera device 10 having a camera body 12 in which an objective lens 14 directs light from an ambient scene onto a focal plane for image capture. A photographer can view the scene to be photographed through a viewfinder 16. The camera includes a visible light framing emitter 18 that produces a scanned visible beam of light which outlines a portion of the ambient scene to be recorded and appears, for example, as a readily visible red rectangular frame on the scene. A scene measuring system 20 measures a characteristic or aspect of the scene such as the camera-to-scene distance and/or the ambient light conditions. The scan rate of the beam emitted from the framing emitter 18 is adjusted in accordance with the measured scene aspect so as to increase frame visibility.

The camera in which the framing aid is provided can be any one of a variety of image capture devices, such as a still camera that records images into an electronic memory for storage or onto a silver-halide filmstrip for exposure, or a video camera, or a movie film camera. The preferred embodiment will be described with respect to a photographic still camera. The camera 10 includes an image capture button 22 that is used to activate a mechanism of the camera to capture an image of the ambient scene. A flash unit 24 provides supplemental illumination of the scene, if necessary. The scan rate of the emitter beam can be manually adjusted by an optional adjustment switch 26.

In a still camera, the image capture button 22 is a two-position switch such that pressing the button to a first position activates the framing aid emitter 18 and pressing the button to a second position deactivates the framing aid emitter and activates the image capture mechanism of the camera 10. In a still camera, for example, the image capture mechanism comprises a shutter (not illustrated). By deactivating the emitter during image capture, a camera user is ensured that the framing aid will not be visible in the captured image.

Those skilled in the art will appreciate that other implementations of emitter control will be necessary for other types of cameras to avoid the presence of the framing aid on objects in the captured images. For example, video cameras likely would have an image capture button that permits the framing aid beam to be extinguished during actual image recording and to be illuminated during the vertical blanking interval known to those skilled in the art. Optionally, the framing aid beam can be scanned just outside the camera's field of view, thereby obviating the need to extinguish the framing aid during image recordation.

The scene aspect that is used to control the beam scan rate can assume a variety of measured characteristics. For example, the beam scan rate can be controlled according to the detected amount of ambient light in the scene. Alternatively, the beam scan rate can be controlled in accordance with the distance from the camera 10 to an object of interest aligned with the optical axis 19 or to the object nearest the camera. The beam scan rate also can be controlled in accordance with both aspects, that is, the ambient light level and also the distance to the object.

Figure 2:
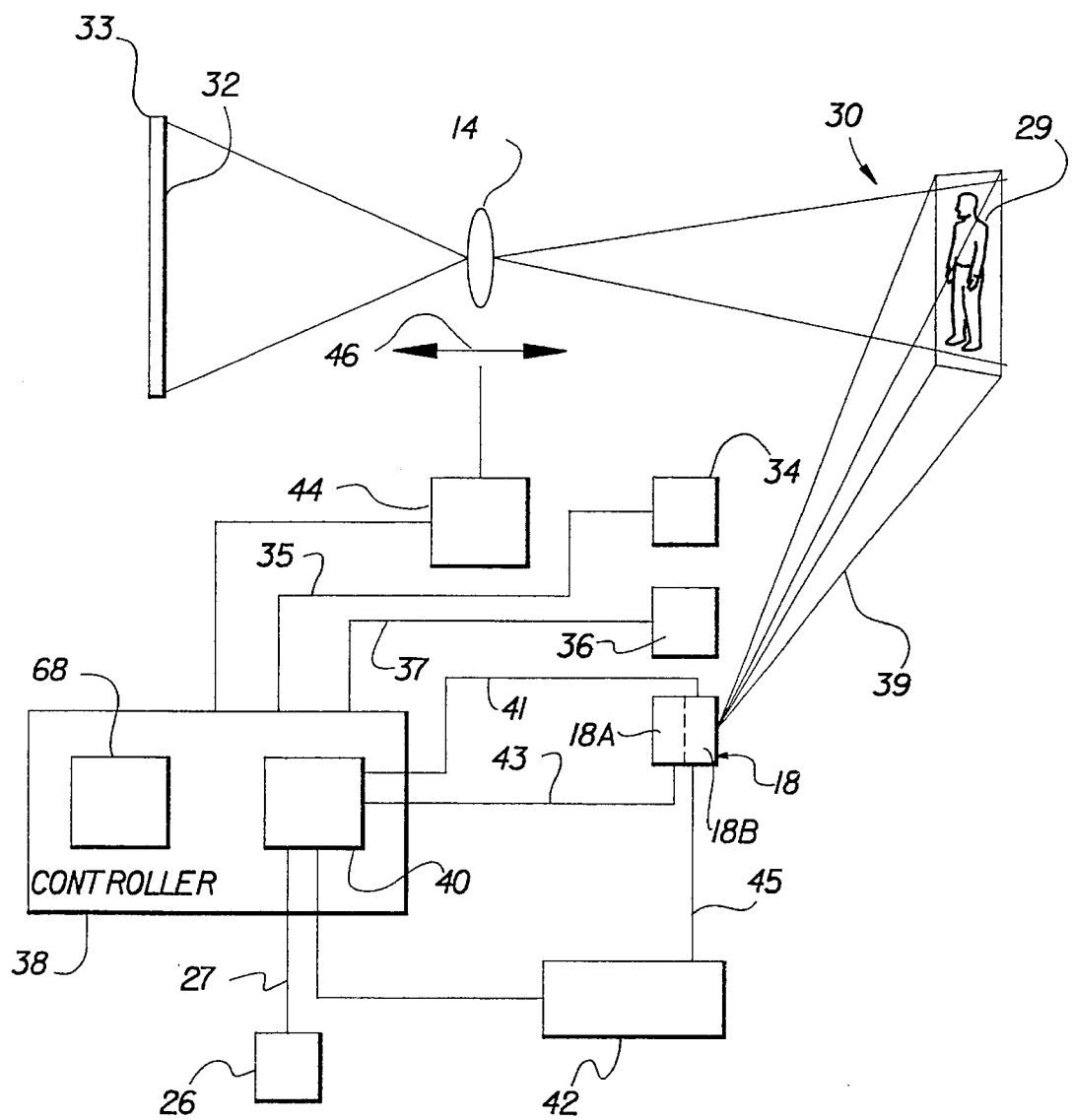
FIG. 2 is a schematic representation of the camera illustrated in FIG. 1.

FIG. 2 illustrates a preferred embodiment of the camera 10 illustrated in FIG. 1 and shows some of the camera elements in schematic representation. FIG. 2 shows that the camera has a field of view such that light from an object 29 in the ambient scene 30 enters the camera 10 through the objective lens 14 and is directed onto a focal plane 32 at which an image capture medium 33 is located. The image capture medium can comprise, for example, electronic photoreceptors such as photodiodes in an array for digital representation of the captured image or can comprise a silver-halide filmstrip or plate that is exposed and then developed.

In the preferred embodiment, the scene measuring system 20 measures both ambient light level and camera-to-object distance. Thus, the scene measuring system of the camera 10 includes an ambient light sensor 34 that receives and measures ambient light from the scene 30 and includes a distance beam sensor 36 that receives light reflected off the object 29. The reflected light preferably comprises light that is first emitted from an infrared light emitter (not shown) in camera 10, reflected off the object, and then received back at the camera by the sensor. The reflected light is used to determine the distance from the camera to the object.

In the preferred embodiment, the ambient light sensor and distance beam sensor are shared with an automatic exposure system of the camera and an automatic focus system of the camera, respectively. Thus, the ambient light sensor 34 comprises part of an automatic exposure system that sets exposure parameters such as lens diaphragm diameter and shutter open time and the distance beam sensor 36 comprises part of an automatic focus system that determines camera-to-object distance and controls lens focus setting.

A camera controller 38 receives ambient light level information from the ambient light sensor 34 and receives distance information from the distance measuring sensor 36 over an ambient signal line 35 and a distance signal line 37, respectively. The controller includes an emitter controller 40 that controls a power source 42 and framing emitter 18. Controller 40 adjusts the light beam scan rate in accordance with the ambient light level and/or the distance to the object information received over the signal lines 35, 37 respectively.

Framing emitter 18 includes a visible light emitter (illumination source) 18A, preferably a laser diode, and a scanning section 18B. Controller 40 operates light emitter 18A via a signal line 43 and scanning section 18B via a signal line 41. Visible light emitter 18A emits a highly collimated beam of visible radiation (illumination) which is linearly scanned onto scene 30 by scanning section 18B. Scanned beam 39 outlines the camera's field of view as the beam emanates away from the camera. The details of such a laser emitter and scanner are disclosed in the above referenced U.S. Pat. No. 5,059,019 (the '019 patent), the disclosure of which is incorporated herein by reference. The scan rate is controlled by, for example, controlling the electrical signal used to operate motor M in FIG. 5 of the '019 patent.

The beam is scanned sufficiently fast that the beam is perceived to be a solid frame (visible linear indication of a scanned region of the scene) in the scene. Although the visible linear indication is shown as a rectangle, it can assume other linear forms such as a zigzag line, a curvilinear line etc. The rate of scan is controlled to adjust the brightness of the frame as scene conditions vary so that the light frame appears to have a constant brightness. The power source 42 provides illuminating power to the framing emitter 18 via a power connection 45 and can comprise, for example, a camera battery that also is used to power other camera systems. FIG. 2 shows that the camera controller 38 includes an automatic focus setting system that uses the distance information to control a lens focus motor 44 and adjust the focus of the objective lens 14, as indicated by the arrows 46.

Generally, the beam scan rate is decreased as the distance to the object 29 and ambient light level increase, thereby allowing the light beam to have a longer dwell time at each point about the frame. As such, the perceived brightness by the camera user will remain essentially constant irrespective of object-camera distance and/or ambient light level. Under some conditions, however, the framing aid 39 might not be readily visible on an object 29 regardless of the distance. For example, the ambient light level might be so great that the ambient light will overwhelm the framing aid and prevent the framing aid from being visible about the object at any useful camera-to-object distance. Accordingly, the emitter controller 40 prevents operation of the framing emitter 18 if the measured ambient light level exceeds a predetermined value. This automatic shut-off conserves power from the power source 42.

As described further below, the emitter controller 40 also prevents operation of the framing emitter 18 at distances less than a minimum operating distance and greater than a maximum operating distance. The minimum operating distance is selected to be a minimum camera-to-object distance at which acceptable image capture takes place, due to the minimum lens focus distance and acceptable blur circle. The maximum operating distance is selected according to the distance and light levels at which the framing aid will not be visible about the object. The maximum operating distance can vary with the ambient light level and therefore, as noted above, in the preferred embodiment the emitter controller makes use of information from both the automatic exposure system and the automatic focus system.

Figure 3:
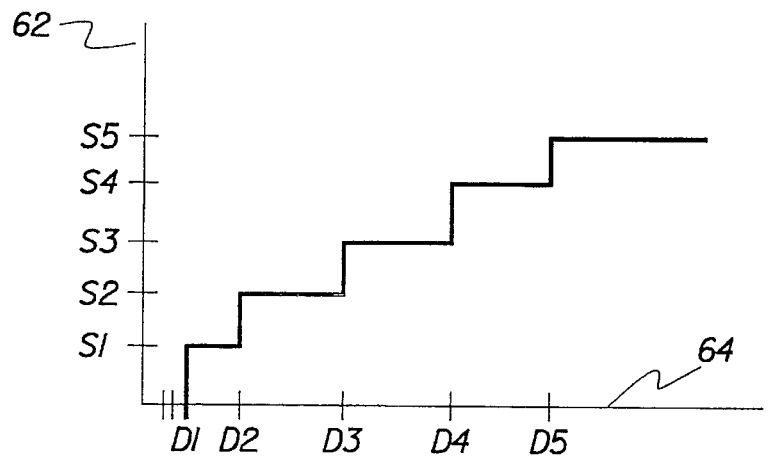
FIGS. 3, 4, and 5 are representations of the relationship between emitter output, ambient light level, and object distance.
Figure 4:
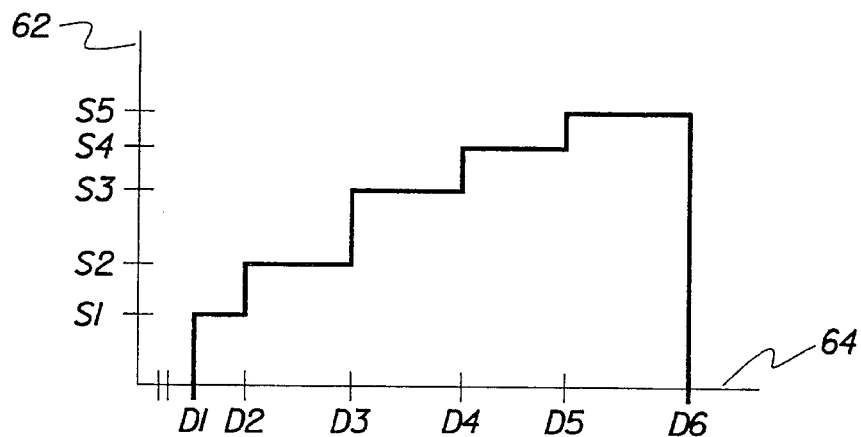
Figure 5:
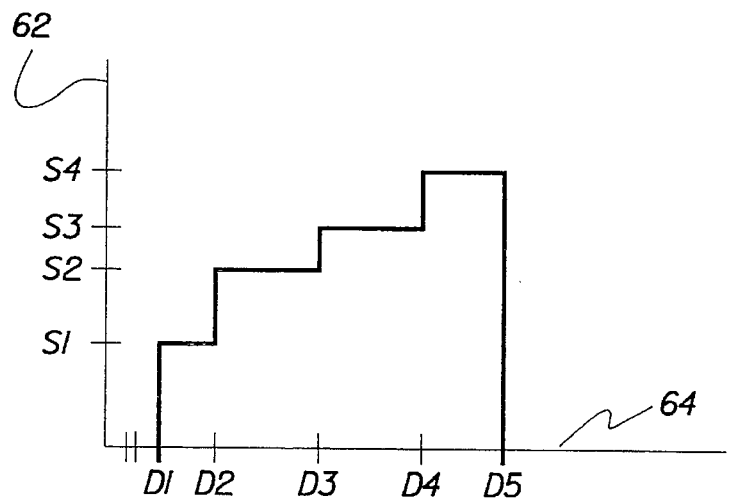

FIGS. 3, 4, and 5 are graphical representations of the relationship between rate of beam scan and object distance for low, medium, and high ambient light levels, respectively. FIGS. 3–5 illustrate a stair-step relationship between the scan rate and the distance to the object. Other types of scan rate relationships, such as continuous, linear, or sinusoidal, will occur to those skilled in the art and may be implemented according to the particular camera and image capture medium intended for use. Those skilled in the art will understand how to implement such functions without further explanation.

FIG. 3 is a graph that shows the relationship between scan rate on the vertical axis 62 and the distance to an object on the horizontal axis 64 for a low ambient light level. Standard techniques known to those skilled in the art can be used to measure the scan rate of the beam 39. In FIG. 3, S1 represents the fastest scan rate while S5 represents the slowest scan rate. D1 represents the shortest distance while D5 represents the longest distance. FIG. 3 shows that the distance-scan rate relationship is a generally inversely proportional one, wherein the beam scan rate is steadily decreased with increasing distance up to a minimum scan rate indicated by S5. Thus, FIG. 3 shows that the farther an object is from the camera, the slower the scan rate that is permitted by the emitter controller 40. This relationship ensures that under a low ambient light condition a camera user will perceive a light frame of relatively equal brightness on an object regardless of the distance from the camera to that object.

A stair-step relationship between object distance and scan rate as depicted in FIG. 3 is selected because it is easier to implement than the alternative relationships. Thus, camera-to-object distance as detected by the camera is divided into multiple distance intervals, and the light beam scan rate within each distance interval is the same. In this way, the beam scan rate is changed only when a distance interval is changed. This reduces the number of data points that must be implemented by the emitter controller 40 and makes design of the system easier. In the illustrated embodiment, five distance intervals are used. Those skilled in the art will appreciate that a more nearly continuous relationship, such as a linear relationship or sinusoidal relationship, would be more complicated to implement in terms of the number of data points required.

In the preferred embodiment, the framing emitter 18 (FIG. 2) is not operated if an object is closer to the camera 10 than a minimum operating distance D1. As noted above, the minimum operating distance comprises a minimum distance for acceptable image capture. For example, if the camera 10 is a fixed-focus camera, the minimum acceptable image distance typically is approximately four and one-half feet (1.5 meters). Preferably, the scan rate is controlled so that the minimum operating distance is equal to the minimum lens focus distance.

In the FIG. 3 graph, the minimum operating distance is indicated by D1. The dashed lines on the distance axis 64 indicate compression of the distance scale for purposes of illustration. FIG. 3 illustrates that, for distances less than D1, the emitter is not operated. Thus, the absence of the framing aid is an indication to the camera user that the camera is closer to the object than the minimum focus distance of the objective lens and that the user should increase the distance to obtain an acceptable image. Rather than turning off the framing aid, the system can take other action, such as flashing the framing aid on and off at perceptible intervals. Turning the framing aid off, however, conserves battery power.

Thus, for the low ambient light level illustrated in FIG. 3, the stair-step relationship between object distance and beam scan rate begins at the minimum operating distance D1 with a beam scan rate of S1. In accordance with a stair-step relationship, the scan rate is constant for a first distance interval that extends from D1 to a second distance D2. A second distance interval extends from the distance D2 to a distance D3, during which scan rate is constant at a level of S2. This type of scan rate function is repeated for a third distance interval defined by D3 to D4 at scan rate S3, a fourth distance interval defined by D4 to D5 at scan rate S4, and a fifth distance interval defined by distance D5 and greater at scan rate S5. The scan rate S5 represents a minimum scan rate for the low ambient light level.

FIG. 4 is a graph that illustrates the relationship between beam scan rate and distance under a condition of medium light level. Again, beam scan rate is shown along the vertical axis 62 and camera-to-object distance is shown along the horizontal axis 64. The emitter controller 40 implements the scan rate-distance relationship to ensure that under a medium brightness condition a camera user will perceive a light frame of relatively equal brightness on an object regardless of distance to the object. FIG. 4 shows that the scan rate decreases relatively slowly until a certain distance D3 is achieved, and then decreases relatively quickly to the minimum scan rate S5. This time, six distance intervals are used. It should be noted that the distances D1, D2, ..., D6 illustrated in FIG. 4 do not necessarily coincide with the distances D1, D2, ..., D5 illustrated in FIG. 3, and likewise for the scan rates S1, S2, ..., S5. In particular, it should be noted that the initial scan rate S1 is slower under medium ambient light level (FIG. 4) than the scan rate S1 under low ambient light level (FIG. 3). In this way, the user perceives a frame of equal brightness about the object regardless of distance and ambient light level.

FIG. 4 shows that a minimum operating distance D1 also is implemented for the medium ambient light level. Thus, the framing aid is not operated at camera-to-object distances less than D1. In the preferred embodiment, the framing aid system also includes a maximum operating distance shut-off feature that halts operation of the beam when it is likely the framing aid will not be readily visible on the object. That is, under a medium ambient light level, the framing aid beam 39 most likely will not be visible at distances greater than a maximum operating distance indicated in FIG. 4 by the distance D6. At distances greater than D6, the ambient light level overwhelms the framing aid, which cannot be readily discerned by most users. It would be wasteful to provide power to the framing emitter 18 at such distances. Therefore, FIG. 4 illustrates that the framing emitter is not operated at distances greater than D6. In this way, the power source 42 is not unnecessarily drained.

FIG. 5 illustrates the relationship of beam scan rate to distance under a high ambient light level. FIG. 5 shows that under bright light the beam scan rate decreases relatively quickly, especially after a point D2, to a minimum scan rate S4. FIG. 5 shows that the emitter is not operated after a maximum distance D5, which is less than the maximum operating distance D6 illustrated in FIG. 4. This reduced maximum operating distance occurs because, under high ambient light levels, the framing aid is quickly overwhelmed by the ambient light and is not readily visible on the object. With regard to beam visibility under the high ambient light condition, it should be noted that the initial scan rate S1 of FIG. 5 is less than the corresponding initial scan rate S1 for the other two light level graphs FIG. 3 and FIG. 4, again owing to the need to overcome ambient light to produce a visible frame. It also should be noted that only four distance intervals are used under the high ambient light level condition of FIG. 5 and only four scan rates are used as well, owing to the early turn-off of the emitter.

In an alternative embodiment of the invention, the brightness of the illumination is varied according to changes in one or more scene parameters by varying the electrical power supplied to the illumination source. For example, by varying the current supplied to a laser diode, the brightness of a laser beam emitted by the diode is varied.

As noted above, an optional adjustment switch 26 can be provided for a camera user to adjust beam scan rate. The switch preferably is implemented so that the switch controls the minimum scan rate illustrated in FIGS. 3, 4, and 5. Thus, the switch 26 provides a control input to the emitter controller 40 via a signal line 27 through which the user can effectively modify the graphs illustrated in FIGS. 3, 4, and 5 to set the minimum permitted scan rate to a level not greater than that otherwise permitted by the illustrated graphs.

A system clock 68 illustrated in FIG. 2 conveniently permits a beam exposure limit for automatic shut-off of the framing emitter 18. This feature could be important, for example, if the framing emitter produces a laser beam and it is desired to limit the maximum time during which an object 29 in the scene 30 could be exposed to constant illumination, so that the risk of injury is controlled. When a camera user activates the framing emitter by pressing the image capture button 22, the emitter controller 40 uses the system clock to determine the length of time during which the user steadily presses the button. It is unlikely a user could fix the camera 10 such that the beam 39 were scanned over the same spot for the entire duration of button pressing. Nevertheless, the emitter controller shuts off the framing emitter after a predetermined time interval of constant button pressing to limit the potential exposure time to the beam. This reduces the risk of injury due to excessive beam exposure and also conserves the power source 42. The emitter beam can be re-activated only after the user releases the image capture button.

Thus, a camera constructed in accordance with the present invention emits a framing aid that can assist a camera user in composing an object of interest within the camera's field of view with or without using a viewfinder. The scan rate of the light beam is controlled so that the user perceives a frame of generally equal brightness over variations in ambient light and camera-to-object distance.

The present invention has been described above in terms of presently preferred embodiments so that an understanding of the present invention can be conveyed. There are, however, many configurations for camera pointing aids not specifically described herein, but with which the present invention is applicable. The present invention should therefore not be seen as limited to the particular embodiments described herein, but rather, it should be understood that the present invention has wide applicability with respect to camera pointing aids generally. All modification, variations, or equivalent arrangements that are within the scope of the attached claims therefore should be considered within the scope of the invention.

PARTS LIST camera 10
camera body 12
objective lens 14
viewfinder 16
framing aid emitter 18
visible light emitter 18A
scanner section 18B
objective lens optical axis 19
scene measuring system 20
image capture button 22
flash unit 24
emitter adjustment switch 26
adjustment switch signal line 27
object 29
ambient scene 30
focal plane 32
image capture medium 33
ambient light sensor 34
ambient signal line 35
distance beam sensor 36
distance signal line 37
camera controller 38
framing aid beam 39
emitter controller 40
scanner section control line 41
power source 42
emitter control signal line 43
lens focus motor 44
power line 45
arrows 46
beam scan rate vertical axis 62
distance to an object horizontal axis 64
system clock 68

I claim:

1. A camera device for a photographer viewing a scene to be photographed comprising an illumination source for illuminating the scene, and means for linearly scanning the scene with said illumination source to provide a visible linear indication of a scanned region of the scene, is characterized by:

control means for automatically varying the brightness of the illumination in accordance with changes in one or more scene parameters, to ensure constant visibility of the linear indication.

2. The camera device of claim 1, wherein said one or more scene parameters include a camera-to-scene distance.

3. The camera device of claim 2, wherein the brightness of the illumination is increased as the camera-to-scene distance increases.

4. The camera device of claim 1, wherein said one or more scene parameters include the ambient light level.

5. The camera device of claim 4, wherein the brightness of the illumination is increased as the ambient scene light increases.

6. The camera device of claim 1 wherein said control means varies the brightness of the illumination by varying a scan rate of said scanning means in accordance with changes in one or more scene parameters.

7. A camera device for a photographer viewing a scene to be photographed comprising an illumination source for illuminating at least a portion of a perimeter of the scene, and means for linearly scanning the illuminated portion of the perimeter to provide a visible frame of at least a portion of the scene, is characterized by:

control means connected to said illumination source for automatically varying the brightness of the illumination of at least a portion of the perimeter in accordance with changes in one or more scene parameters, to ensure constant visibility of the frame of at least a portion of the scene.

8. A method for providing a visible linear indication in a scene to be photographed, comprising the steps of:

illuminating the scene;

linearly scanning the scene with said illumination source to provide a visible linear indication of a scanned region of the scene; and automatically varying the brightness of the illumination in accordance with changes in one or more scene parameters, to ensure constant visibility of the linear indication.

9. A camera device for a photographer viewing a scene to be photographed comprising means for projecting a focused laser beam onto the scene, and means for moving the projected beam continuously along a closed path at the scene to provide a visible frame indication at the scene, is characterized by:

means for automatically varying the brightness of the projected beam in accordance with changes in one or more scene parameters, to ensure constant visibility of the frame indication.

\* \* \* \* \*